US 9,085,371 B2

(12) United States Patent
Blechen

(10) Patent No.: US 9,085,371 B2
(45) Date of Patent: Jul. 21, 2015

(54) AUTOMATIC THROTTLE ROLL ANGLE COMPENSATION

(75) Inventor: Frederick Charles Henry Blechen, Redmond, WA (US)

(73) Assignee: The Boeing Company, Chicago, IL (US)

(*) Notice: Subject to any disclaimer, the term of this patent is extended or adjusted under 35 U.S.C. 154(b) by 1675 days.

(21) Appl. No.: 12/274,756

(22) Filed: Nov. 20, 2008

(65) Prior Publication Data

US 2010/0125378 A1    May 20, 2010

(51) Int. Cl.

| G05D 1/00 | (2006.01) |
|---|---|
| B64C 13/00 | (2006.01) |
| B64D 31/08 | (2006.01) |
| G05D 1/04 | (2006.01) |
| G05D 1/06 | (2006.01) |
| G05D 1/08 | (2006.01) |
| G05D 1/10 | (2006.01) |

(52) U.S. Cl.
CPC .............. B64D 31/08 (2013.01); G05D 1/042 (2013.01); G05D 1/0607 (2013.01); B64C 13/00 (2013.01); G05D 1/0808 (2013.01); G05D 1/101 (2013.01)

(58) Field of Classification Search
CPC ... G05D 1/042; G05D 1/0607; G05D 1/0623; G05D 1/063; G05D 1/0638; G05D 1/0808; G05D 1/0825; G05D 1/101; B64D 2700/02254; B64D 2700/62263; B64D 31/08; B64C 13/00; B64C 17/00
USPC ........................... 701/3–7; 244/75.1, 180–182
See application file for complete search history.

(56) References Cited

U.S. PATENT DOCUMENTS

| 2,553,546 | A |   | 5/1951 | Brannin |  |
|---|---|---|---|---|---|
| 2,561,291 | A | * | 7/1951 | Rethorst | 244/50 |
| 3,128,967 | A | * | 4/1964 | Hays, Jr. | 244/181 |
| 3,691,356 | A | * | 9/1972 | Miller | 701/15 |
| 3,967,799 | A |   | 7/1976 | Muller |  |
| 3,989,208 | A | * | 11/1976 | Lambregts | 244/182 |
| 4,490,793 | A | * | 12/1984 | Miller | 701/3 |
| 4,589,616 | A | * | 5/1986 | Zweifel | 244/180 |
| 4,641,268 | A | * | 2/1987 | Zweifel et al. | 701/121 |
| 4,767,085 | A | * | 8/1988 | Boudreau et al. | 244/182 |
| 4,841,448 | A |   | 6/1989 | Ford |  |

(Continued)

FOREIGN PATENT DOCUMENTS

| DE | 102007012425 A1 | 9/2008 |
|---|---|---|
| EP | 0482250 A1 | 4/1992 |

(Continued)

OTHER PUBLICATIONS http://www.pilotfriend.com/training/flight_training/aero/man_force.htm "Fixed Wing Flight Training".*

(Continued)

*Primary Examiner* — Jack W Keith
*Assistant Examiner* — Chuong P Nguyen
(74) *Attorney, Agent, or Firm* — Yee & Associates, P.C.

(57) ABSTRACT

A method, apparatus, and computer program product for adjusting a thrust for an aircraft. A level of thrust is dynamically identified using a drag on the aircraft needed to substantially maintain a speed of the aircraft in a turn to form an identified level of thrust during turning of the aircraft. The turn of the aircraft is performed using the identified level of thrust.

11 Claims, 5 Drawing Sheets

(56) References Cited

U.S. PATENT DOCUMENTS

| | | | | |
|---|---|---|---|---|
| 5,029,778 | A | * | 7/1991 | DeLuca .......................... 244/234 |
| 5,442,909 | A | * | 8/1995 | Snow et al. ...................... 60/204 |
| 5,606,505 | A | * | 2/1997 | Smith et al. ..................... 701/99 |
| 5,984,240 | A | | 11/1999 | Shinagawa |
| 6,062,513 | A | * | 5/2000 | Lambregts ..................... 244/175 |
| 6,246,929 | B1 | * | 6/2001 | Kaloust ........................... 701/11 |
| 6,282,466 | B1 | * | 8/2001 | Nolte et al. ..................... 701/11 |
| 6,922,618 | B2 | * | 7/2005 | Luo .................................. 701/3 |
| 7,284,984 | B1 | * | 10/2007 | Zyskowski ...................... 434/30 |
| 7,706,932 | B2 | | 4/2010 | Morales De La Rica et al. |
| 2005/0128138 | A1 | * | 6/2005 | McCabe et al. ............... 342/195 |
| 2008/0046171 | A1 | * | 2/2008 | Bitar et al. .................... 701/208 |
| 2008/0133069 | A1 | * | 6/2008 | Morales De La Rica et al. ................................. 701/4 |
| 2010/0042270 | A1 | | 2/2010 | Villaume |
| 2010/0042271 | A1 | | 2/2010 | Holzhausen |
| 2010/0087970 | A1 | * | 4/2010 | Blechen ............................ 701/8 |
| 2010/0222944 | A1 | * | 9/2010 | Blechen ............................ 701/6 |

FOREIGN PATENT DOCUMENTS

| | | | |
|---|---|---|---|
| EP | 1364872 A2 | * 11/2003 | ............. B64C 15/02 |
| FR | 2909462 A1 | 6/2008 | |

OTHER PUBLICATIONS

USPTO Office Action regarding U.S. Appl. No. 12/394,299, dated Dec. 8, 2011, 12 pages.
USPTO non-final office action dated May 25, 2012 regarding U.S. Appl. No. 12/394,299, 18 Pages.
Office Action, dated Nov. 1, 2013, regarding U.S. Appl. No. 12/394,299, 22 pages.
Final Office Action, dated Jun. 12, 2014, regarding U.S. Appl. No. 12/394,299, 20 pages.
Extended European Search Report, dated Jul. 7, 2014, regarding Application No. EP10155029.1, 6 pages.
Notice of Allowance, dated Feb. 11, 2015, regarding U.S. Appl. No. 12/394,299, 15 pages.

* cited by examiner

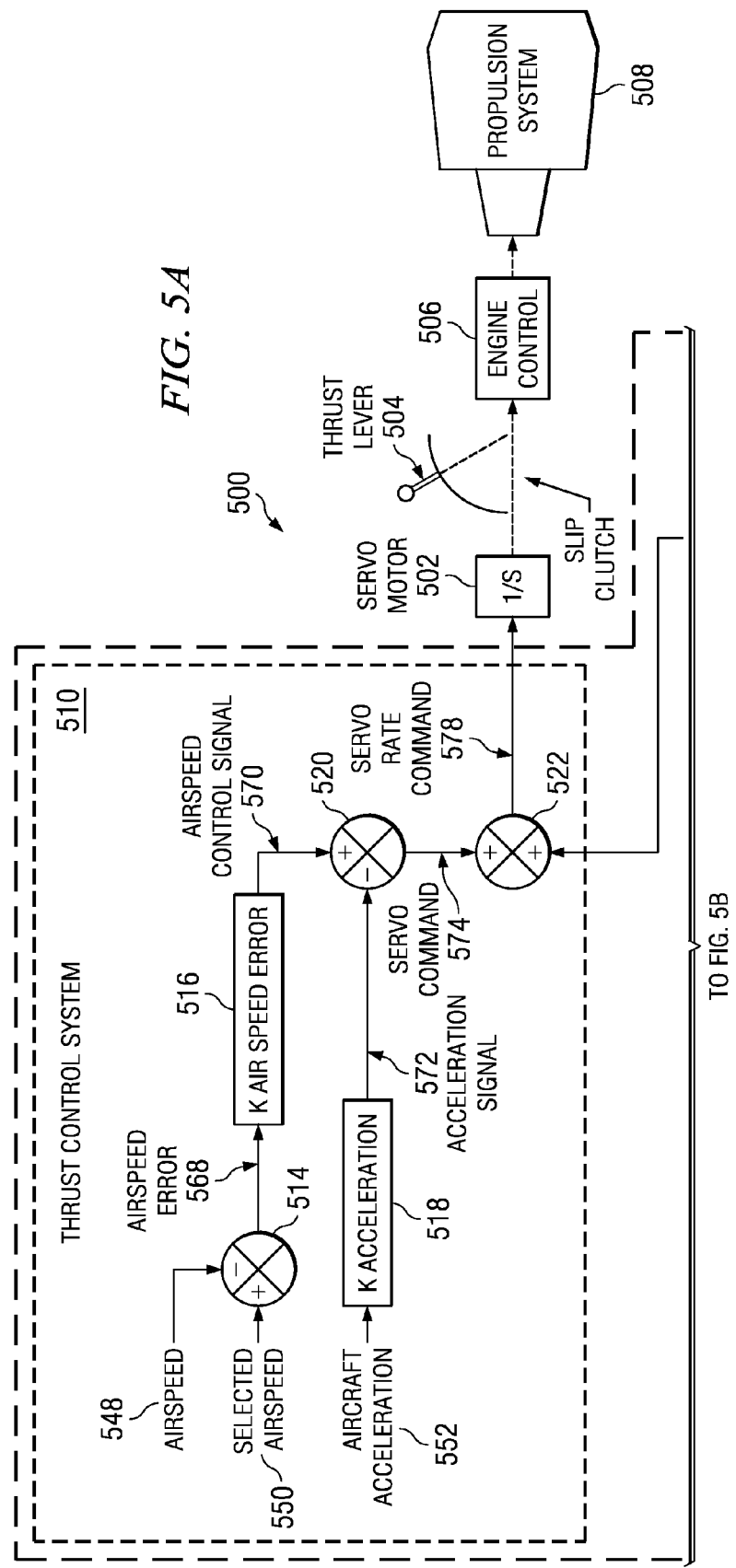

AUTOMATIC THROTTLE ROLL ANGLE COMPENSATION

GOVERNMENT LICENSE RIGHTS

This invention was made with Government support under contract number N00019-04-C-3146 awarded by the United States Navy. The Government has certain rights in this invention.

BACKGROUND INFORMATION

1. Field

The present disclosure relates generally to aircraft and, in particular, to a method and apparatus for managing the operation of an aircraft. Still more particularly, the present disclosure relates to a method and apparatus for managing thrust for an aircraft operating at a roll angle.

2. Background

During operation, an aircraft may fly in the air as a result of an aerodynamic force called lift. Lift is generated by the wings of an aircraft as air flows past the wings as a result of forward movement of the aircraft. The wings of an aircraft generate lift because of a pressure reduction on the upper side of the wings. The lower pressure on the upper side of a wing combined with a higher pressure on the underside of the wing provides the lift. Lift may be increased by increasing the angle of the wing cord relative to the airflow. This angle is also referred to as the angle of attack.

When an aircraft performs a turn, the roll angle increases, which increases the angle of attack for the aircraft. With the increase in the angle of attack, drag also may be increased. Without sufficient thrust, the aircraft may slow, further decreasing the wing lift. Further, the aircraft also may change altitude. These changes in the movement of the aircraft are often undesirable during a turn. Instead, it is desirable to maintain the speed of the aircraft into a turn as well as substantially maintaining the altitude of the aircraft.

Existing automatic throttle systems may generate thrust based on a roll angle compensation that is calculated using a versine of the roll angle. A versine is also referred to as a versed sign and is a trigonometric function such as, for example, versine $(\beta)=1-\text{cosine }(\beta)$. This type of compensation for generating thrust is adequate for aircraft maneuvering at low roll angles, because the versine is an approximation for the reciprocal of cosine of roll. A low roll angle may be around 30 degrees or less. These types of throttle systems for generating thrust are typically inaccurate for roll maneuvers that are above around 25 to around 30 degrees.

Therefore, it would be advantageous to have a method and apparatus that overcomes at least some of the issues described above.

SUMMARY

In one advantageous embodiment, a method is present for adjusting thrust for an aircraft. A level of thrust is dynamically identified during turning of the aircraft using a drag on the aircraft needed to substantially maintain a speed of the aircraft in a turn to form an identified level of thrust. The turn of the aircraft is performed using the identified level of thrust.

In another advantageous embodiment, an apparatus comprises a process and a computer, wherein the process is located on the computer. The process is capable of dynamically identifying a level of thrust using drag on the aircraft needed to substantially maintain a speed of the aircraft in a turn to form an identified level of thrust and performing the turning of the aircraft using the identified level of thrust during turning of an aircraft.

In yet another advantageous embodiment, a computer program product is present for adjusting thrust for an aircraft. The computer program product comprises a computer recordable storage medium and program code stored on the computer recordable storage medium. Program code is present for dynamically identifying a level of thrust using a drag on the aircraft needed to substantially maintain a speed of the aircraft in a turn to form an identified level of thrust during turning of the aircraft. Program code is also present for performing the turn of the aircraft using the identified level of thrust.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIGS. 5A and 5B are diagrams of a thrust control system with compensation for roll angles in accordance with an advantageous embodiment.

DETAILED DESCRIPTION

Figure 1:
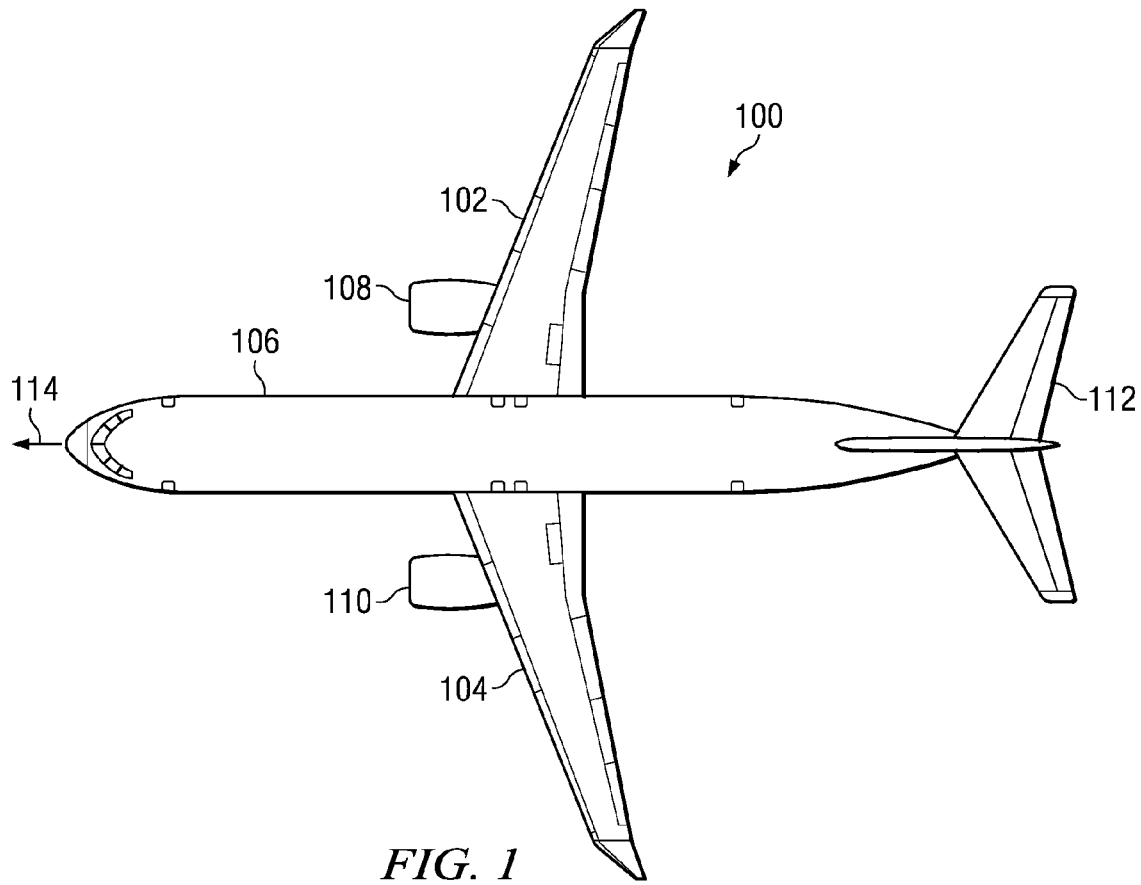
FIG. 1 is a diagram of an aircraft in which an advantageous embodiment may be implemented.

With reference now to the figures and, in particular, with reference to FIG. 1, a diagram of an aircraft is depicted in accordance with an advantageous embodiment. Aircraft 100 is an example of an aircraft in which automatic control with roll angle compensation may be implemented. In particular, hardware and/or software may be implemented within aircraft 100 to identify a maximum safe roll angle for level flight with a reference load factor.

In this illustrative example, aircraft 100 has wings 102 and 104 attached to fuselage 106. Aircraft 100 also includes engine 108, engine 110, and horizontal stabilizer 112. Aircraft 100 may make a number of different types of maneuvers. Some maneuvers may be lateral maneuvers in which aircraft 100 remains at the same altitude. In other words, lateral maneuvering is maneuvering on a horizontal plane, while vertical maneuvering is up and down movement relative to a vertical plane. Aircraft 100 also may perform vertical maneuvers in which the aircraft changes altitude. Aircraft 100 also may perform maneuvers in which aircraft 100 turns and minimizes and/or does not change altitude.

With these maneuvers and types of turns, aircraft 100 may change a roll angle. A roll angle represents the turning of an aircraft about longitudinal body axis 114. The amount of rotation around longitudinal body axis 114 is the roll angle. The roll angle also may be referred to as a bank angle or roll attitude. It may be desirable to maintain speed and/or altitude in a turn in which the roll angle changes. As the roll angle increases, it may be more difficult to maintain speed and/or altitude in a turn.

With these types of maneuvers, changes in thrust may be generated using the different advantageous embodiments in a manner that takes into account the roll angle and drag on aircraft 100. The different advantageous embodiments may generate changes in thrust to maintain substantially the same airspeed for the turn or lateral maneuver. The different advantageous embodiments may be implemented in many other types of aircraft such as, for example, a commercial aircraft, a military aircraft, an unmanned aerial vehicle (UAV), or some other suitable type of aircraft.

Figure 2:
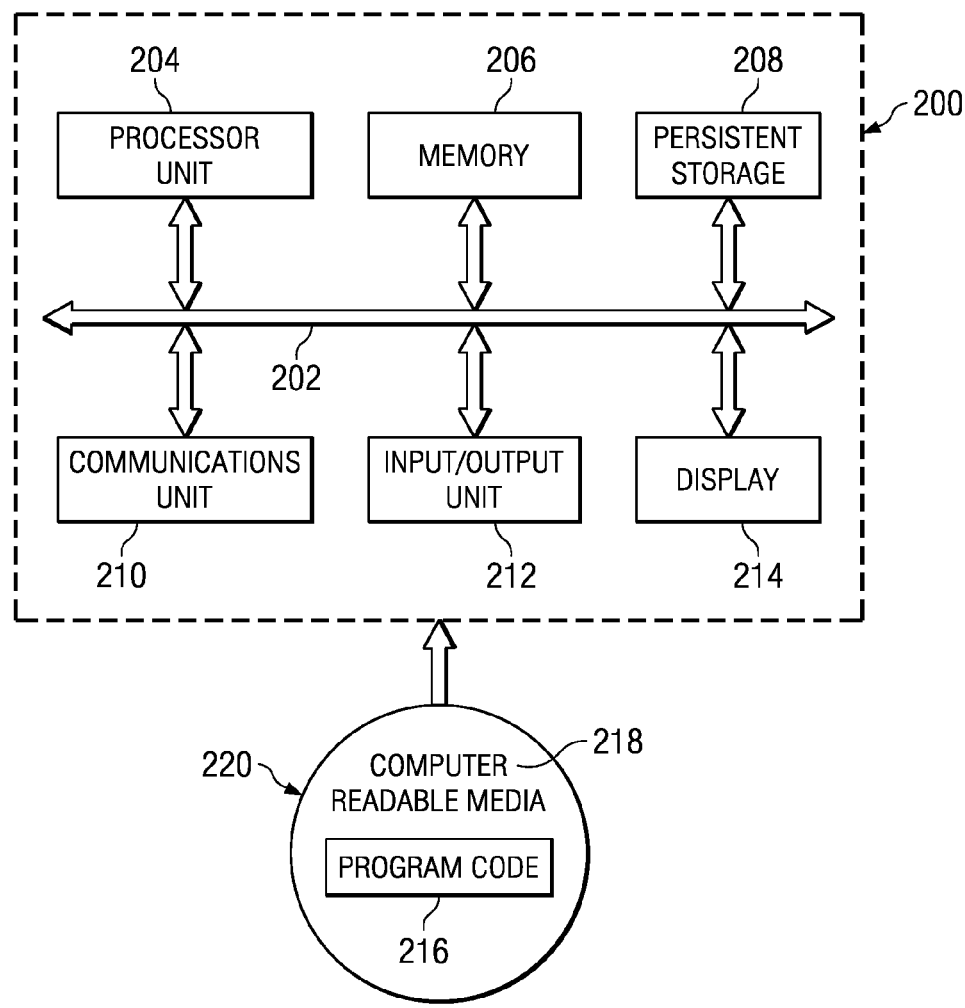
FIG. 2 is a diagram of a data processing system in accordance with an illustrative embodiment.

Turning now to FIG. 2, a diagram of a data processing system is depicted in accordance with an illustrative embodiment. Data processing system 200 is an example of a data processing system that may be found in an aircraft such as, for example, aircraft 100 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer, an aircraft crew display, a telecommunication system, and/or a servo motor. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200.

Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
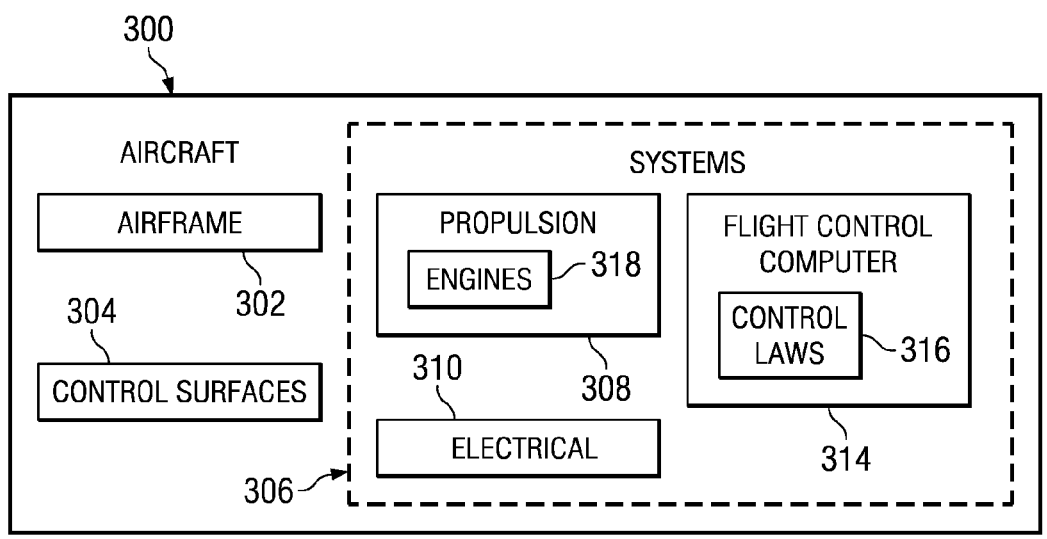
FIG. 3 is a block diagram of an aircraft in accordance with an advantageous embodiment.

With reference now to FIG. 3, a block diagram of an aircraft is depicted in accordance with an advantageous embodiment. Aircraft 300 illustrates components that may be found in an aircraft such as, for example, aircraft 100 in FIG. 1. In this illustrative example, aircraft 300 has airframe 302 on which flight control surfaces 304 may be located. Further, systems 306 also may be integrated into or on airframe 302. These systems include, for example, propulsion system 308, electrical system 310, and flight control computer 314.

Flight control computer 314 may control various components such as, for example, propulsion system 308 and electrical system 310, to control the operation of aircraft 300. Flight control computer 314 may perform these controls through the execution of software containing control laws 316. With control laws 316, flight control computer 314 is capable of controlling engines 318 through commands sent to propulsion system 308.

The different advantageous embodiments may be implemented in software such as, for example, control laws 316, to allow for automatic control of aircraft 300. The different advantageous embodiments may adjust the thrust generated by engines 318 during a turn in a manner that substantially maintains the speed of the aircraft and/or substantially maintains the altitude of the aircraft in the turn.

The different advantageous embodiments provide a method and apparatus for adjusting thrust for an aircraft. During turning the aircraft, the level of thrust is dynamically identified using a drag on the aircraft in which the level of thrust is the level needed to substantially maintain a speed of the aircraft in the turn. The turning of the aircraft is performed using the identified level of thrust.

In the different advantageous embodiments, dynamically identifying a level of thrust means that the level of thrust is identified multiple times during the turn. In other words, the level of thrust is not merely identified once. Instead, the level of thrust may be identified continuously or some number of times needed to substantially maintain the speed of the aircraft in the turn.

A number, as used herein, when referring to items, means one or more items. For example, a number of times means one or more times, such as each second of time. The level of thrust may be expressed in a number of different ways. For example, the level of thrust may be expressed as the thrust needed to maintain the speed in the turn. In another example, the level of thrust may be a rate of change of thrust needed to maintain the speed in the turn.

Figure 4:
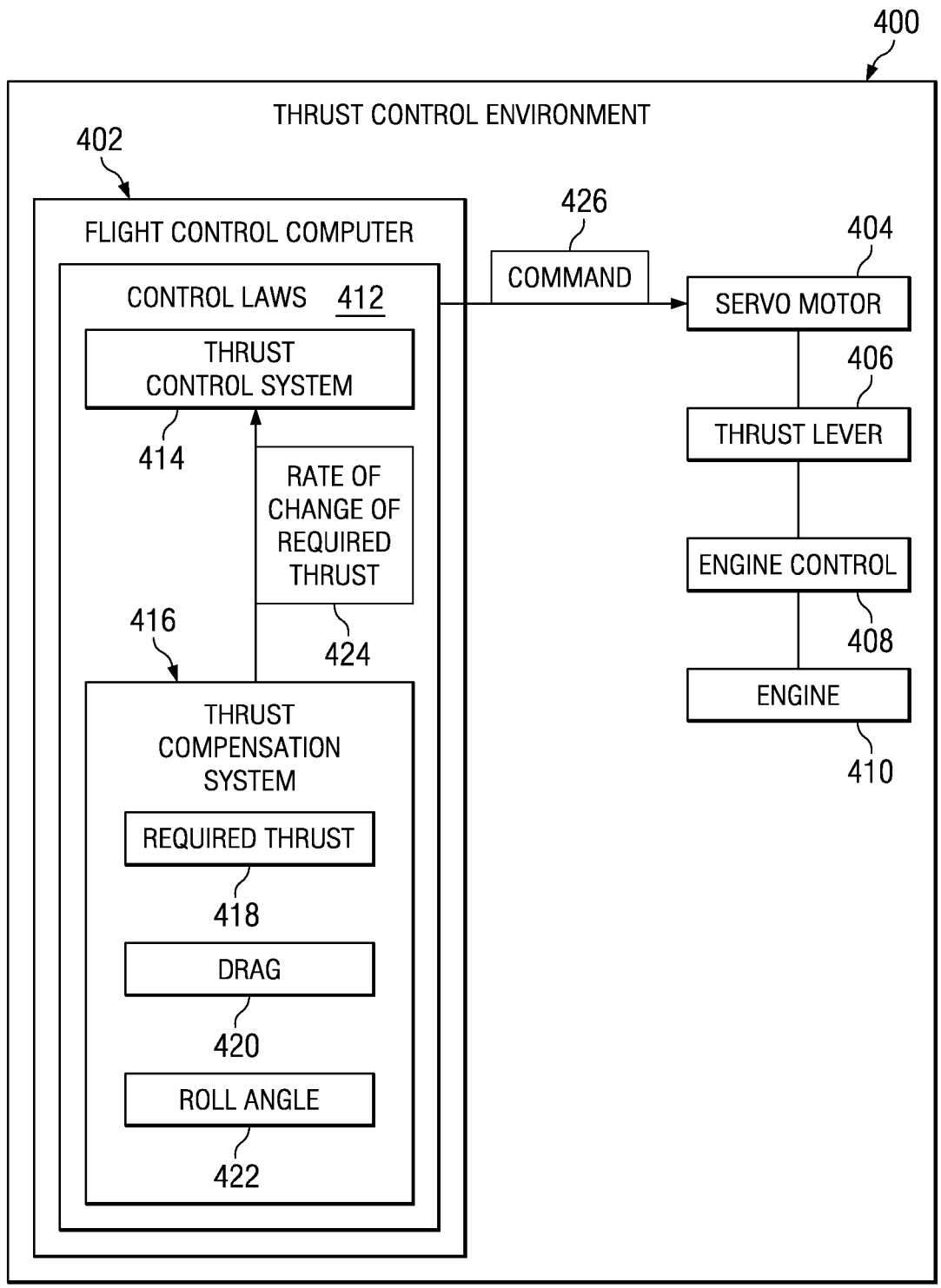
FIG. 4 is a diagram of a thrust control environment in accordance with an advantageous embodiment.

With reference now to FIG. 4, a diagram of a thrust control environment is depicted in accordance with an advantageous embodiment. Thrust control environment 400 is an example of an environment that may be implemented in aircraft 300 in FIG. 3. Thrust control environment 400 includes flight control computer 402, servo motor 404, thrust lever 406, engine control 408, and engine 410.

Flight control computer 402 executes software such as, for example, control laws 412. Control laws 412 control the operation of an aircraft in response to commands generated by an operator, state information about the aircraft, position of the aircraft, orientation of the aircraft, and/or other suitable information.

In this illustrative example, software in control laws 412 may include thrust control system 414 and thrust compensation system 416. Thrust control system 414 controls the thrust of an aircraft. Thrust control system 414 generates adjustments to the thrust identified by thrust compensation system 416 based on the drag on the aircraft. As the drag on the aircraft changes, thrust compensation system 416 may generate compensation used by thrust control system 414 to generate a level of thrust needed to substantially maintain a speed of the aircraft in a turn. By substantially maintaining the speed of the aircraft, the altitude of the aircraft also may be substantially maintained around the same altitude.

In these examples, the level of thrust is required thrust 418 in these examples. Required thrust 418 may be identified by thrust compensation system 416 using drag 420. Drag 420 is the drag on the aircraft. Roll angle 422 affects drag 420. The level of thrust may be the predicted thrust based on drag 420.

Once required thrust 418 is identified, thrust compensation system 416 generates rate of change of required thrust 424, which is sent to thrust control system 414. Rate of change of required thrust 424 is used by thrust control system 414 to generate command 426. Rate of change of required thrust 424 may be the level of thrust.

Command 426 is sent to servo motor 404. Command 426 may be a servo rate command, which identifies a rate of change for the position of the servo motor. Servo motor 404 may change the position of thrust lever 406 and/or the thrust commanded by engine control 408. The rate of change in command 426 may change the thrust generated by engine 410 to a level of thrust needed to maintain substantially the same speed and/or substantially the same altitude during the turn. Command 426 may be, for example, a positive value, a negative value, or zero.

By using drag 420, thrust compensation system 416 may be capable of increased accuracy in identifying the amount of thrust needed to maintain substantially the same speed and/or substantially the same altitude during a turn. This accuracy may be greater than currently used processes and/or mechanisms with roll angles that may be greater than around 25 to around 30 degrees.

The identification of required thrust 418 is performed dynamically during the turn. Dynamically is periodically over time. In other words, the identification of required thrust 418 is not made once or pre-calculated. Instead, the identification is made during different time intervals during the turn. The period or time interval may be selected such that the identification is made continuously.

The illustration of thrust control environment 400 in FIG. 4 is not meant to imply physical and/or architectural limitations to the manner in which different advantageous embodiments may be implemented. In other advantageous embodiments, other components in addition to, or in place of, the ones illustrated may be used. For example, in other advantageous embodiments, a display may be present to indicate the thrust levels generated in thrust control environment 400. Further, other types of controls for changing thrust other than thrust lever 406 may be implemented. Engine control 408 uses command 426 to change the thrust of engine 410.

In other words, the different advantageous embodiments generate a roll angle compensation term used to create a thrust lever rate command from dynamic pressure and aerodynamic data. The roll angle is used in a calculation to identify the drag on the aircraft. The different advantageous embodiments may provide better thrust control for roll angles up to around 60 degrees.

Figure 5B:
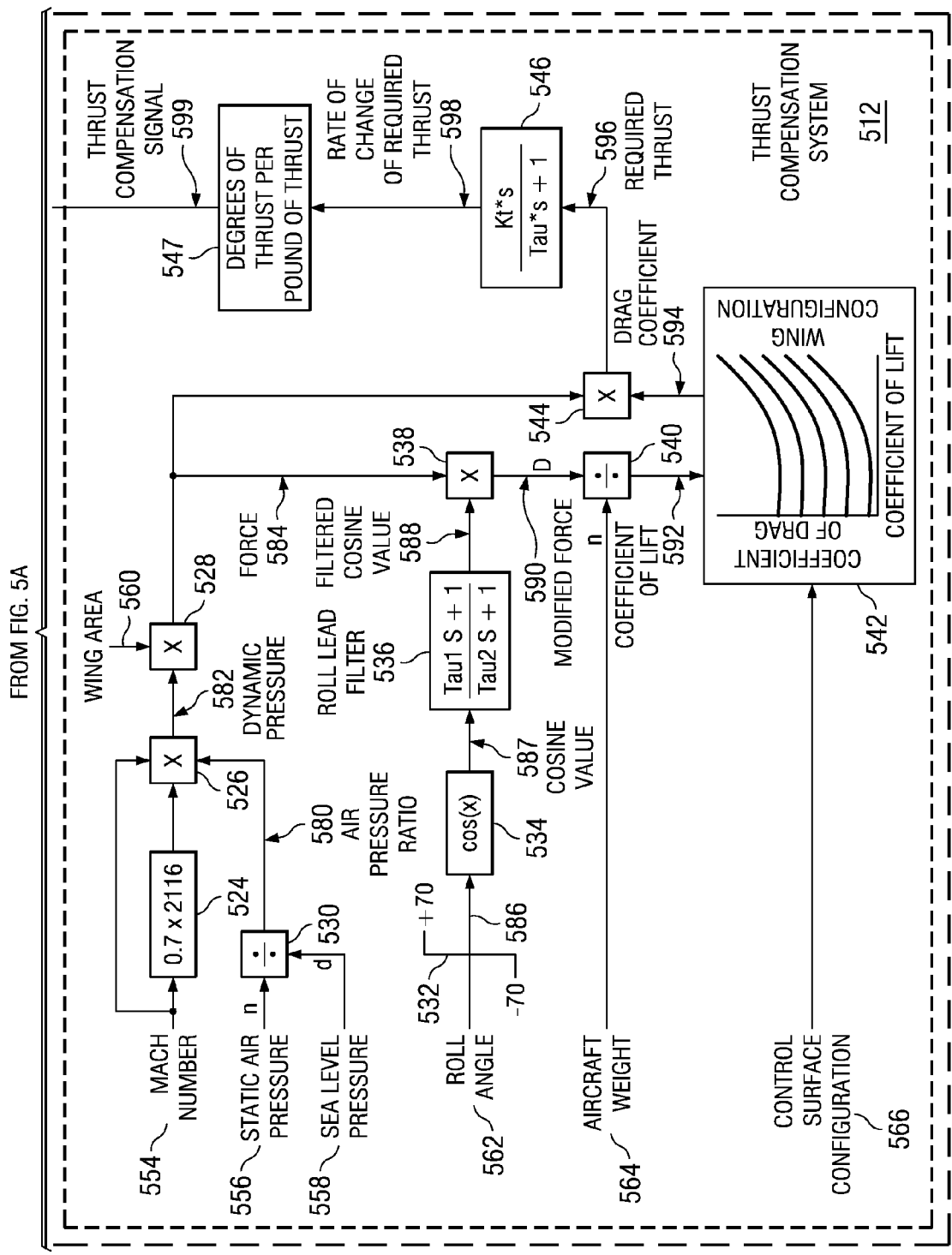

With reference now to FIGS. 5A and 5B, diagrams of a thrust control system with compensation for roll angles is depicted in accordance with an advantageous embodiment. Thrust control environment 500 is an example of a system that may be implemented within thrust control environment 400 in FIG. 4.

Thrust control environment 500 may send commands to servo motor 502 to control thrust lever 504 and engine control 506 in a manner to control the thrust generated by propulsion system 508. In these examples, these commands may be generated by thrust control system 510 and thrust compensation system 512 in the manner described below. Thrust control system 510 is an example of one implementation for thrust control system 414 in FIG. 4, and thrust compensation system 512 is an example of one implementation for thrust compensation system 416 in FIG. 4. In this illustrative example, thrust control system 510 includes subtractor 514, gain unit 516, gain unit 518, subtractor 520, and adder 522.

Thrust compensation system 512 includes constant 524, multiplier 526, multiplier 528, divider 530, limiter 532, cosine unit 534, roll lead filter 536, multiplier 538, divider 540, coefficient data structure 542, multiplier 544, filter 546, and degrees of thrust per pound of thrust 547.

Inputs into thrust control environment 500 include airspeed 548, selected airspeed 550, aircraft acceleration 552, mach number 554, static air pressure 556, sea level pressure 558, wing area 560, roll angle 562, aircraft weight 564, and control surface configuration 566.

In this illustrative example, subtractor 514 subtracts airspeed 548 from selected airspeed 550 to generate airspeed error 568. Airspeed error 568 is multiplied by a value at gain unit 516 to generate airspeed control signal 570. Aircraft acceleration 552 is multiplied by a value at gain unit 518 to generate acceleration signal 572. Acceleration signal 572 is subtracted from airspeed control signal 570 at subtractor 520 to generate servo command 574.

Servo command 574 is summed with thrust compensation signal 599 generated by thrust compensation system 512 to generate servo rate command 578, which is sent to servo motor 502. Servo rate command 578 is a rate of change in the amount of thrust lever. For example, servo rate command 578 may cause servo motor 502 to change at a number of degrees per second. The number of degrees per second may vary depending on servo rate command 578.

Servo motor 502 may then change thrust lever 504 to alter the thrust generated through engine control 506 to propulsion system 508. The change in thrust lever 504 changes engine control 506 to set or select a particular number of revolutions per minute for propulsion system 508 in these examples. In addition, a human operator also may adjust thrust lever 504 in addition to changes made by servo motor 502.

In this manner, servo rate command 578 may change the movement of servo motor 502, depending on the difference between the airspeed air in airspeed control signal 570 and acceleration signal 572 with an adjustment from thrust compensation signal 599.

In this illustrative example, mach number 554 is multiplied by constant 524. In this example, constant 524 may be selected to be around 0.7×2116. Constant 524 represents a conversion factor for converting a mach squared times air pressure ratio to pounds per square foot. Mach number 554 may be squared when the result of multiplying mach number 554 by constant 524 is multiplied by mach number 554 at multiplier 526.

The result of multiplying mach number 554 by constant 524 is sent to multiplier 526 along with mach number 554. An additional input into multiplier 526 is received from divider 530, which divides static air pressure 556 by sea level pressure 558. The output from divider 530 is air pressure ratio 580. The output of multiplier 526 is dynamic pressure 582, Q, in pounds per square foot. Dynamic pressure 582 is multiplied by wing area 560 at multiplier 528 to generate force 584, Q_bar_S. In these examples, force 584 represents dynamic pressure times wing area in which S is the wing area.

Roll angle 562 is processed by limiter 532. Limiter 532 may limit roll angle to a value between around −70 degrees to around +70 degrees. Of course, other angles may be used for limits in limiter 532, depending on the particular implementation. The output of limiter 532 is processed roll angle 586, which is sent into cosine unit 534. Cosine unit 534 generates a cosine of the roll angle to form cosine value 587. Cosine value 587 is then sent into roll lead filter 536. Roll lead filter 536 filters cosine value 587 to generate filtered cosine value 588. Roll lead filter 536 may be used to improve time response and/or reduce noise. In this example, roll lead filter 536 may be implemented as $$\frac{Tau1S + 1}{Tau2S + 1}.$$

In this example, S is the Laplace operator used for describing time domain filters, and Tau1 and Tau2 are time constants describing the filters' bandwidth characteristics.

Filtered cosine value 588 is multiplied with force 584 to generate modified force 590, which is sent to divider 540. Filtered cosine value 588 is used to generate a roll angle modification of force 584. In the different advantageous embodiments, the roll angle of an aircraft may change the drag on the aircraft. This roll angle is taken into account by adjusting force 584 in these examples. Modified force 590 is used to divide aircraft weight 564 to obtain coefficient of lift 592. Modified force 590 is dynamic pressure times wing area divided by load factor. Load factor is 1/(Cos(roll angle)).

Coefficient of lift 592 is sent into coefficient data structure 542 along with control surface configuration 566 to obtain drag coefficient 594. Control surface configuration 566 may be identified from sensors identifying the locations of various control surfaces such as, for example, flaps, slats, spoilers, loading gear, landing gear doors, body speed brakes, deployable landing lights, and other suitable control surfaces or other moveable surfaces that may affect the wing or fuselage configuration in a manner that affects the coefficient of lift. Of course, any moveable surface or feature on the fuselage and/or wing may be taken into account.

Coefficient data structure 542 may be implemented in a number of different ways. Coefficient data structure 542 may be implemented using any number of data structures or architectures for storing and/or organizing data. For example, coefficient data structure 542 may be a plurality of graphs or tables in which each graph or table may be used to identify a maximum lift coefficient based on a particular configuration for the control surfaces. These control surfaces may include, for example, without limitation, the positions of flaps, slats, spoilers, landing gear, body speed brakes, deployable landing lights, and other movable surfaces on the aircraft.

Drag coefficient 594 is multiplied by force 584 to generate required thrust 596. The required thrust is around the same as the net aircraft drag. In these illustrative examples, required thrust 596 may be the amount of thrust needed to maintain the aircraft at around the same attitude and/or the same speed during a turn or maneuver that involves changing the roll angle of the aircraft.

Required thrust 596 is sent into filter 546, which generates rate of change of required thrust 598. Filter 546 changes required thrust 596 into rate of change of required thrust 598 for use in adjusting the thrust of the aircraft. Required thrust 596 may be in units of pounds per second. In this example, filter 546 may be implemented as follows:

$$X = \frac{Kt^*s}{Tau^*s + 1}.$$

S is Laplace operator used for describing time domain filters. Tau is a time constant describing the filters-bandwidth characteristics.

In these examples, Kt may be 1.0, and S represents the Laplace operator, which is used to describe the time domain filter. This value is sent to unit 547, which converts rate of change of required thrust 598 into thrust compensation signal 599, which is added to servo command 574 to generate servo rate command 578. In these examples, rate of change of required thrust 598 may be in pounds per second, while thrust compensation signal 599 may be in degrees of thrust lever per second.

The illustration of thrust system 500 is not meant to imply physical or architectural limitations to the manner in which different thrust control systems may be implemented. For example, other components in addition to, or in place of, the ones illustrated may be employed in other advantageous embodiments.

Figure 6:
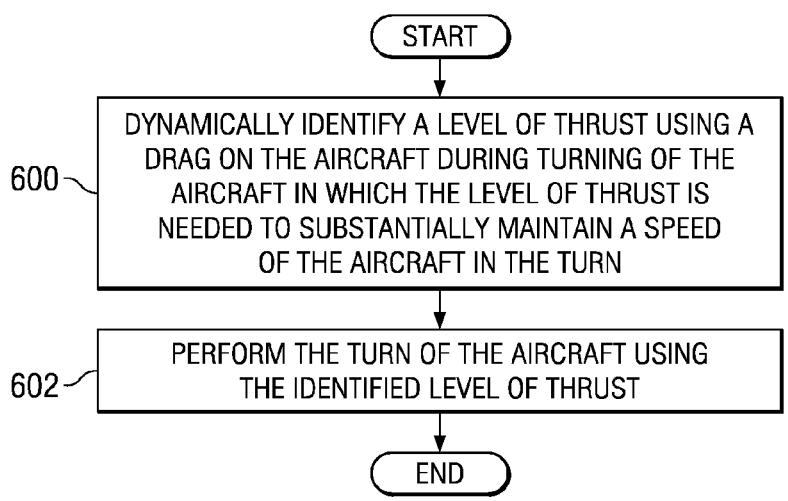
FIG. 6 is a flowchart of a process for operating an aircraft in accordance with an advantageous embodiment.

With reference now to FIG. 6, a flowchart of a process for operating an aircraft is depicted in accordance with an advantageous embodiment. The process illustrated in FIG. 6 may be implemented in an aircraft, such as aircraft 100 in FIG. 1. In particular, the process may be implemented in control laws, such as control laws 412 in FIG. 4.

The process begins by dynamically identifying a level of thrust using a drag on the aircraft during turning the aircraft and then updating the required thrust during turning of the aircraft in which the level of thrust is needed to substantially maintain a speed of the aircraft in the turn (operation 600). The process then performs the turn of the aircraft using the identified level of thrust (operation 602), with the process terminating thereafter when the turn is completed.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer program product for providing adjustments to thrust during a turning operation. In the different advantageous embodiments, the thrust is adjusted based on an identification of the drag on the aircraft. The roll angle for the aircraft in a turn may be used to identify the amount of drag on the aircraft.

By identifying thrust based on the drag on the aircraft and directly with a cosine of the roll angle rather than an approximation of the roll angle, the different advantageous embodiments may provide improved thrust adjustments to maintain speed and/or altitude of an aircraft during turns that may have various angles.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for adjusting a thrust for an aircraft, the method comprising:
   during turning of the aircraft, a computer dynamically identifying a drag on the aircraft, wherein the drag is calculated using:
      a roll lead filter computation (536) of a cosine value (587) of a roll angle (562) of the aircraft, the roll lead filter computation producing a filtered cosine value (588);
      a force (584) representing a dynamic pressure (582) times a wing area (560) of the aircraft, wherein the filtered cosine value (588) is multiplied by the force (584) to produce a modified force (590);
      a weight (564) of the aircraft, wherein the modified force (590) is used to divide the weight (564) to obtain a coefficient of lift (592); and
      sending the coefficient of lift (592) and a control surface configuration (566) into a data structure (542) to obtain the drag (594);
   identifying one or more levels of thrust over time using the drag on the aircraft, the one or more levels of thrust being needed to substantially maintain a speed of the aircraft during the turning of the aircraft; and
   during the turning of the aircraft, the aircraft using the one or more levels of thrust.

2. The method of claim 1, wherein the control surface configuration is generated by sensors providing locations of components affecting the coefficient of lift comprising at least one of flaps, slats, spoilers, loading gear, landing gear doors, body speed brakes, and deployable landing lights.

3. The method of claim 1 wherein the data structure is in a thrust compensation system.

4. The method of claim 1, further comprising:
   the computer generating a command to change a current thrust of the aircraft to the one or more levels of thrust.

5. The method of claim 4, wherein the computer-generated command is an adjustment to a current thrust command generated by a thrust control system.

6. The method of claim 4, wherein the computer-generated command is an engine control command.

7. The method of claim 1, wherein the one or more levels of thrust comprise a rate of change of thrust.

8. An aircraft comprising:
   a processor configured to determine a drag on the aircraft, wherein the processor is configured to calculate the drag using:
      a roll lead filter computation (536) of a cosine value (587) of a roll angle (562) of the aircraft, the roll lead filter computation producing a filtered cosine value (588);
      a force (584) representing a dynamic pressure (582) times a wing area (560) of the aircraft, wherein the filtered cosine value (588) is multiplied by the force (584) to produce a modified force (590);
      a weight (564) of the aircraft, wherein the modified force (590) is used to divide the weight (564) to obtain a coefficient of lift (592); and
      sending the coefficient of lift (592) and a control surface configuration (566) into a data structure (542) to obtain the drag (594);
   wherein the processor is further configured to determine one or more levels of thrust, during turning of the aircraft, using the drag on the aircraft, the one or more levels of thrust being needed to substantially maintain a speed of the aircraft during the turning, the processor further configured to issue a command to the aircraft to use the one or more levels of thrust during the turning; and
   an engine control configured to cause, responsive to receiving the command, an engine of the aircraft to use the one or more levels of thrust during the turning.

9. The aircraft of claim 8 wherein the control surface configuration is generated by sensors providing locations of components affecting the coefficient of lift comprising at least one of flaps, slats, spoilers, loading gear, landing gear doors, body speed brakes, and deployable landing lights.

10. A non-transitory computer readable storage medium storing program code which, when executed by a computer, is configured to:
    during turning of the aircraft, dynamically determine a drag on the aircraft, wherein the processor is configured to calculate the drag using:
       a roll lead filter computation (536) of a cosine value (587) of a roll angle (562) of the aircraft, the roll lead filter computation producing a filtered cosine value (588);
       a force (584) representing a dynamic pressure (582) times a wing area (560) of the aircraft, wherein the filtered cosine value (588) is multiplied by the force (584) to produce a modified force (590);
       a weight (564) of the aircraft, wherein the modified force (590) is used to divide the weight (564) to obtain a coefficient of lift (592); and
       sending the coefficient of lift (592) and a control surface configuration (566) into a data structure (542) to obtain the drag (594);
    determine one or more levels of thrust over time using the drag on the aircraft, the one or more levels of thrust being needed to substantially maintain a speed of the aircraft during the turning of the aircraft; and
    during the turning of the aircraft, issue a command to the aircraft to use the one or more levels of thrust.

11. The non-transitory computer readable storage medium of claim 10 wherein the control surface configuration is generated by sensors providing locations of components affecting the coefficient of lift comprising at least one of flaps, slats, spoilers, loading gear, landing gear doors, body speed brakes, and deployable landing lights.

\* \* \* \* \*